United States Patent
He et al.

(10) Patent No.: US 10,419,344 B2
(45) Date of Patent: Sep. 17, 2019

(54) MULTICHANNEL INPUT/OUTPUT VIRTUALIZATION

(71) Applicant: AVAGO TECHNOLOGIES INTERNATIONAL SALES PTE. LIMITED, Singapore (SG)

(72) Inventors: Changbai He, San Jose, CA (US); Rajib Dutta, San Jose, CA (US); Michael Li, San Jose, CA (US); Samir Bhattacharya, Pleasanton, CA (US); Tony Devadason Titus, Milpitas, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/939,157

(22) Filed: Mar. 28, 2018

(65) Prior Publication Data

US 2018/0219777 A1 Aug. 2, 2018

Related U.S. Application Data

(63) Continuation of application No. PCT/US2017/028965, filed on Apr. 21, 2017.
(Continued)

(51) Int. Cl.
*H04L 12/28* (2006.01)
*H04L 12/741* (2013.01)
(Continued)

(52) U.S. Cl.
CPC ........ *H04L 45/745* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS

| | | |
|---|---|---|
| 6,651,132 B1 | 11/2003 | Traut |
| 7,334,076 B2 | 2/2008 | Hendel |

(Continued)

FOREIGN PATENT DOCUMENTS

| | | |
|---|---|---|
| WO | 20120017029 A1 | 1/2012 |
| WO | 2017209856 A1 | 12/2012 |
| WO | 2016101149 A1 | 6/2016 |

OTHER PUBLICATIONS

Microsoft "Virtual Address Space" retrieved from https://docs.microsoft.com/en-us/windows/desktop/Memory/virtual-address-space, dated May 30, 2018, 3 pages.

(Continued)

*Primary Examiner* — Farah Faroul
(74) *Attorney, Agent, or Firm* — Xsensus, LLP

(57) ABSTRACT

Provided are systems, methods, and computer-readable medium for enabling sharing of a multi-channel packet processor by multiple processes executing on a network device. The network device can include a memory management unit, configured to include an address map. The address map can include a reserved portion. The virtual machine can allocate a guest portion in the address map, where the guest portion is allocated in a part of the address map that does not include the reserved portion. A first channel from the packet processor can be assigned to the guest portion, and the virtual machine can use the first channel to receive packets. The reserved portion can be assigned to a host process executing on the network device. A second channel from the packet processor can be assigned (Continued)

to the reserved portion. The host process can transmit packets to the network using the second channel.

24 Claims, 6 Drawing Sheets

Related U.S. Application Data

(60) Provisional application No. 62/343,728, filed on May 31, 2016, provisional application No. 62/343,811, filed on May 31, 2016.

(51) Int. Cl.
| | |
|---|---|
| *G06F 13/28* | (2006.01) |
| *G06F 12/02* | (2006.01) |
| *G06F 9/455* | (2018.01) |
| *G06F 12/1072* | (2016.01) |
| *G06F 15/173* | (2006.01) |
| *H04L 12/861* | (2013.01) |
| *G06F 12/06* | (2006.01) |
| *G06F 9/50* | (2006.01) |
| *H04L 12/54* | (2013.01) |
| *H04L 12/931* | (2013.01) |
| *H04L 12/713* | (2013.01) |
| *H04L 12/773* | (2013.01) |
| *H04L 29/06* | (2006.01) |

(52) U.S. Cl.
CPC ...... *G06F 12/0223* (2013.01); *G06F 12/0284* (2013.01); *G06F 12/0292* (2013.01); *G06F 12/0653* (2013.01); *G06F 12/1072* (2013.01); *G06F 13/28* (2013.01); *G06F 15/17331* (2013.01); *H04L 12/56* (2013.01); *H04L 45/586* (2013.01); *H04L 45/60* (2013.01); *H04L 49/70* (2013.01); *H04L 49/90* (2013.01); *G06F 2009/45575* (2013.01); *G06F 2009/45583* (2013.01); *G06F 2212/152* (2013.01); *G06F 2212/154* (2013.01); *G06F 2212/657* (2013.01); *H04L 69/22* (2013.01)

(56) References Cited

U.S. PATENT DOCUMENTS

| | | | |
|---|---|---|---|
| 7,434,025 B2 | 10/2008 | Taillefer | |
| 7,613,847 B2 | 11/2009 | Kjos et al. | |
| 7,636,831 B1 | 12/2009 | Subrahmanyam | |
| 7,739,422 B2 | 6/2010 | Hua et al. | |
| 8,060,683 B2 | 11/2011 | Shultz et al. | |
| 8,103,809 B1 | 1/2012 | Michels et al. | |
| 8,392,628 B2 | 3/2013 | Santos et al. | |
| 8,533,796 B1 | 9/2013 | Shenoy et al. | |
| 8,607,004 B2 | 12/2013 | Anderson | |
| 8,806,266 B1 | 8/2014 | Qu et al. | |
| 8,839,239 B2 | 9/2014 | Raj et al. | |
| 8,856,518 B2 | 10/2014 | Sridharan et al. | |
| 8,990,799 B1 | 3/2015 | Forecast | |
| 9,047,221 B2 | 6/2015 | Guthrie et al. | |
| 9,081,603 B2 | 7/2015 | Zhang et al. | |
| 9,146,763 B1 | 9/2015 | Mehat et al. | |
| 9,176,889 B1 | 11/2015 | Earhart, III | |
| 9,195,585 B2 | 11/2015 | Phelan et al. | |
| 9,417,899 B2 | 8/2016 | Hepkin et al. | |
| 9,454,496 B2 | 9/2016 | Lim | |
| 2002/0029308 A1* | 3/2002 | Babaian | G06F 9/45504 710/240 |
| 2007/0168643 A1 | 7/2007 | Hummel et al. | |
| 2010/0161929 A1 | 6/2010 | Nation et al. | |
| 2011/0022818 A1* | 1/2011 | Kegel | G06F 12/1081 711/206 |
| 2012/0017029 A1 | 1/2012 | Santos et al. | |
| 2012/0278803 A1 | 11/2012 | Pavlov | |
| 2012/0331465 A1 | 12/2012 | Tanikawa | |
| 2013/0263118 A1* | 10/2013 | Kannan | G06F 9/45558 718/1 |
| 2014/0007097 A1 | 1/2014 | Chin et al. | |
| 2014/0089528 A1* | 3/2014 | Bloch | G06F 12/08 710/4 |
| 2015/0052279 A1 | 2/2015 | Hart | |
| 2015/0229656 A1* | 8/2015 | Shieh | H04L 63/1408 726/22 |
| 2015/0261952 A1 | 9/2015 | Sliwa et al. | |
| 2015/0263887 A1* | 9/2015 | Sajeepa | H04L 41/0803 709/220 |
| 2015/0309839 A1 | 10/2015 | Lu | |
| 2016/0094668 A1* | 3/2016 | Chang | H04L 67/16 709/223 |
| 2017/0147378 A1* | 5/2017 | Tsirkin | G06F 9/45558 |
| 2018/0181421 A1* | 6/2018 | Connor | G06F 15/17306 |

OTHER PUBLICATIONS

Alan Ott "Virtual Memory and Linux" Embedded Linux Conference Apr. 4-6, 2016, 71 pages.
Ardalan Amiri Sani "Making I/O Virtualization Easy with Device Files" Apr. 13, 2013, 12 pages.
Yi Ren "Shared-Memory Optimizations for Inter-Virtual-Machine Communication" ACM Computing Surveys (CSUR) ,vol. 48 Issue 4, Article No. 49, New York, NY, May 2016, 40 pages.
International Search Report and Written Opinion for PCT/US2017/028965, dated Aug. 3, 2017, 10 pages.
Extended European Search Report dated Mar. 26, 2019, issued in corresponding Ep Application No. 17807160.1, 9 pages.

\* cited by examiner

MULTICHANNEL INPUT/OUTPUT VIRTUALIZATION

CROSS REFERENCE TO RELATED APPLICATIONS

This application is a continuation of International Application No. PCT/US2017/028965, filed on Apr. 21, 2017, which claims the benefit of and priority to U.S. Provisional Application 62/343,728, filed on May 31, 2016, and U.S. Provisional Application 62/343,811, filed on May 31, 2016. The entire contents of each of the aforementioned applications is incorporated herein by reference in their entirety and for all purposes.

BRIEF SUMMARY

The present disclosure relates generally to networking technologies, and more particularly to systems and methods for sharing a network packet processor that is designed for high Input/Output (I/O) performance between host processes running the user space of a network device.

A network device, such as a router, can include I/O devices such as a packet processor. The packet processor can provide Direct Memory Access (DMA) functionality for transmitting packets to and/or receiving packets from a network. In many cases, multiple host-level processes can be executing on the network device, each of which may need to use the packet processor to transmit and/or receive packets. Such host processes can include virtual machines and other processes running in the host operating system.

In various implementations, provided are systems, methods, and computer-readable medium for enable sharing of a high-performance I/O device, such as a packet processor, by multiple processes executing on a network device. In various implementations, the network device can include a memory management unit, such as an I/O Memory Management Unit (IOMMU) The memory management unit can be configured to include an address map. The address map can further be configured to include a reserved portion. Addresses in the reserved portion can correspond to addresses in a host address space, where the host address space is in the memory of the network device. In various implementations, the address space is preserved independently of processes that are using the address space. The network device can further be configured to assigning the address map to a virtual machine executing on the network device. The virtual machine can be configured to allocate a guest portion in the address map, where the guest portion is allocated in a part of the address map that does not include the reserved portion. The network device can further be configured to assign a first channel from the plurality of channels to the guest portion. The virtual machine can further be configured to receive packets from the network using the first channel. The network device can further be configured to assign the reserved portion to a host process executing on the network device, and assign a second channel from the plurality of channels to the reserved portion. The host process can be configured to transmit packets to the network using the second channel.

In various implementations, the host process can be configured to use a virtual address to obtain a physical address. In these implementations, the host process can use the reserved portion to obtain the physical address. This physical address corresponds to an address in the memory, and The virtual address corresponds to a virtual address space of the virtual machine.

In various implementations, the host process can be configured to write a packet to the memory using a physical address. In various implementations, the packet processor can use a DMA operation to transmit the packet onto the network.

In various implementations, the virtual machine can be configured to read a packet from the memory using a virtual address. In various implementations, the packet processor can have received the packet from the network, and have placed the packet in memory using a DMA operation.

In various implementations, the packet processor can be configured to receive, on the second channel, a request to transmit a packet, where the request includes a virtual address. The packet processor can further be configured to obtain, using the reserved portion, a physical address for the virtual address. The packet processor can further be configured to read a packet from the memory using the physical address and transmit the packet.

In various implementations, the packet processor can be configured to receive, at the first channel, a packet. The packet processor can further be configured to obtain, using the address map, a physical address for a virtual address, where the virtual address was configured by the virtual machine. The packet processor can further be configured to write the packet to the memory using the physical address.

In various implementations, the network device can further be configured to determining that the virtual machine has become disabled. The network device can then initiate a new virtual machine, and assigning the address space map to the new virtual machine. The new virtual machine can be configured to allocate a new guest portion in the address map. The reserved portion is also unavailable to the new virtual machine for allocating the new guest portion. The network device can further be configured to assigning the first channel to the new guest portion. The new virtual machine can be configured to receive packets using the first channel.

In various implementations, the address space was previously assigned to another virtual machine. In various implementations, when the virtual machine shuts down, the address space map is preserved. In various implementations, the virtual machine includes a network operating system. In various implementations, the host process includes a software keep-alive process. In various implementations, the plurality of channels can be mapped to an Input/Output (I/O) address space.

DETAILED DESCRIPTION

Figure 1:
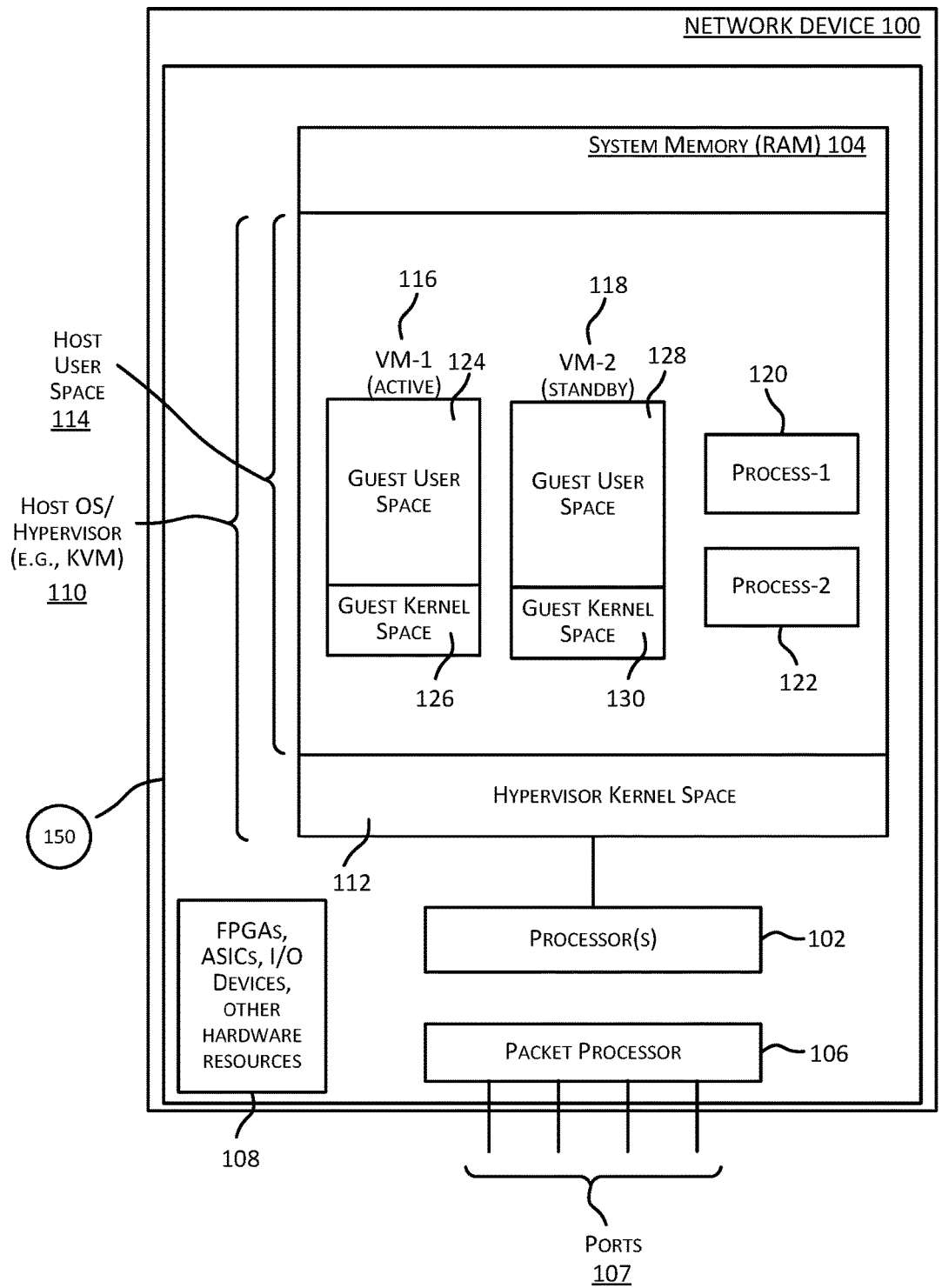
FIG. 1 is a simplified block diagram of a network device (also referred to as a "host system") that may incorporate teachings disclosed herein according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to networking technologies, and more particularly to systems and methods for sharing a high-performance packet processor device between host processes running in the user space of a network device. The packet processor may be designed for high Input/Output (I/O) performance.

A network device, such as a router, can include I/O devices such as a packet processor. The packet processor can provide Direct Memory Access (DMA) functionality for transmitting packets to and/or receiving packets from a network. In many cases, multiple host-level processes can be executing on the network device, each of which may need to use the packet processor to transmit and/or receive packets. Such host processes can include virtual machines and other processes running in the host operating system.

Various techniques can be used to enable sharing of the packet processor's DMA capabilities among host processes, such as software virtualization and Single Root Input/Output Virtualization (SR-IOV). Software virtualization involves running software that emulates the DMA capabilities of the packet processor by performing memory copies, for example from the address space of a host process to an address space assigned to the packet processor for DMA operations. Copying between memory locations can require a large amount of processor time, and thus can reduce the performance of the network device. SR-IOV provides hardware virtualization directly on the packet processor, eliminating the need for software virtualization and removing the potential performance penalty. SR-IOV capability has to be built into the packet processor, however, and not all packet processors including this capability. Whether they have SR-IOV capability or not, packet processors frequently have multiple DMA channels, which can be used to enable sharing of the packet processor without sacrificing performance.

For efficiency and security, the packet processor, as well as other I/O devices, can be managed by an I/O memory management unit (IOMMU). An IOMMU can be used in a system architecture to connect DMA-capable I/O devices to the system's main memory. Among other features, an IOMMU can provide address isolation, so that one I/O device is not able to affect the memory transactions of another I/O device. An IOMMU provides address isolation by assigning a distinct address map to each I/O device. IOMMU address maps are commonly referred to as domains.

An IOMMU address map or domain can provide address translation between the physical addresses used by a processor and the addresses assigned to an I/O device. This feature is particularly useful when the system is executing a virtual machine. Processes executing within the virtual machine use virtual addresses within the virtual address space of the virtual machine, including virtual I/O addresses. The virtual machine can program a packet processor DMA engine with virtual I/O addresses, so that the packet processor can execute DMA transactions for the virtual I/O address space of the virtual machine. An IOMMU can be configured to translate virtual I/O addresses to physical I/O addresses. The packet processor can use this translation to execute DMA transactions.

In many virtual machine configurations, DMA operations for different virtual machines are kept isolated so that one virtual machines is not able to interfere with the I/O functionality of another virtual machine. To accomplish such isolation, in some implementations, one virtual machine can be given exclusive use of a particular I/O device, such as a packet processor, by assigning the domain of the I/O device to the virtual machine. This exclusivity is acceptable in a system design when the virtual machine is the only host process that will use the I/O device.

When another host process is also going to use the I/O device, however, the exclusivity between the virtual machine and I/O device can be a limitation. The other host process (which can be, in some examples, another virtual machine) may be executing in another address space, such as the physical address space of the system's underlying operating system. Alternatively, the other host process can be made to use the virtual addresses of the virtual machine, but then is tethered to the viability of the virtual machine. For example, should the virtual machine go offline, the domain may be removed, in which case the other host process loses access to the I/O device.

In various implementations, systems and methods are provided for sharing a high performance packet processor between multiple host processes without impacting the packet processor's high performance capabilities. In various implementations, a system's IOMMU can be configured as discussed above, where an address map or domain is configured for the packet processor, and the domain is assigned to a virtual machine executing on the system. To enable another host process to use the packet processor, a portion of the domain can be reserved for use by the host process. In this reserved portion, the host process can configure its own address translations. When the virtual machine allocates a region in the domain for its own use, the virtual machine will not be able to use the reserved portion, and must use some other part of the domain.

While reserving a portion of the domain can provide the host process with access to the packet processor, doing so may cause other problems. For example, physical addresses programmed into the domain for use by the virtual machine may conflict (e.g., may overlap) with physical addresses programmed into the domain for use by the host process. As another example, having the virtual machine and the host process both using the packet processor may affect the packet processor's throughput; that is, the rate at which the packet processor can send and/or receive packets.

To resolve these and other problems, the system can make use of the packet processor having multiple channels. In this context, a channel is a software and/or hardware construct that can be mapped to an I/O address space. In various implementations, the system can be configured so that one channel is assigned to the virtual machine and another channel is assigned to the host process. This assignment can be accomplished by programming the regions in the IOMMU domain accordingly.

As noted above, having the host process use a portion of the domain that is assigned to the virtual machine means that the domain may be removed, as part of ordinary clean-up that occurs when the virtual machine goes down. Without the domain, however, the host process's ability to send and/or receive packets is interrupted. Thus, in various implementations, the system can be configured so that, should the virtual machine become disabled, the domain is preserved or otherwise not allowed to be removed. The host process can then continue to send and/or receive packets, even when the virtual machine is no longer operational. Should a new virtual machine be brought online, the system can be configured so that the new virtual machine is assigned the existing domain. In this way, the new virtual machine and the host process can share use of the packet processor.

FIG. 1 is a simplified block diagram of a network device 100 (also referred to as a "host system") that may incorporate teachings disclosed herein according to certain embodiments. Network device 100 may be any device that is capable of receiving and forwarding packets, which may be data packets or signaling or protocol-related packets (e.g., keep-alive packets). For example, network device 100 may receive one or more data packets and forward the data packets to facilitate delivery of the data packets to their intended destinations. In certain embodiments, network device 100 may be a router or switch such as various routers and switches provided by Brocade Communications Systems, Inc. of San Jose, Calif.

As depicted in FIG. 1, the example network device 100 comprises multiple components including one or more processors 102, a system memory 104, a packet processor or traffic manager 106, and optionally other hardware resources or devices 108. Network device 100 depicted in FIG. 1 is merely an example and is not intended to unduly limit the scope of inventive embodiments recited in the claims. One of ordinary skill in the art would recognize many possible variations, alternatives, and modifications. For example, in some implementations, network device 100 may have more or fewer components than those shown in FIG. 1, may combine two or more components, or may have a different configuration or arrangement of components. Network device 100 depicted in FIG. 1 may also include (not shown) one or more communication channels (e.g., an interconnect or a bus) for enabling multiple components of network device 100 to communicate with each other.

Network device 100 may include one or more processors 102. Processors 102 may include single or multicore processors. System memory 104 may provide memory resources for processors 102. System memory 104 is typically a form of random access memory (RAM) (e.g., dynamic random access memory (DRAM), Synchronous DRAM (SDRAM), Double Data Rate SDRAM (DDR SDRAM)). Information related to an operating system and programs or processes executed by processors 102 may be stored in system memory 104. Processors 102 may include general purpose microprocessors such as ones provided by Intel®, AMD®, ARM®, Freescale Semiconductor, Inc., and the like, that operate under the control of software stored in associated memory.

As shown in the example depicted in FIG. 1, a host operating system 110 may be loaded in system memory 104 and executed by one or more processors 102. Host operating system 110 may be loaded, for example, when network device 100 is powered on. In certain implementations, host operating system 110 may also function as a hypervisor and facilitate management of virtual machines and other programs that are executed by network device 100. Managing virtual machines may include partitioning resources of network device 100, including processor and memory resources, between the various programs. A hypervisor is a program that enables the creation and management of virtual machine environments including the partitioning and management of processor, memory, and other hardware resources of network device 100 between the virtual machine environments. A hypervisor enables multiple guest operating systems (GOSs) to run concurrently on network device 100.

As an example, in certain embodiments, host operating system 110 may include a version of a KVM (Kernel-based Virtual Machine), which is an open source virtualization infrastructure that supports various operating systems including Linux, Windows®, and others. Other examples of hypervisors include solutions provided by VMWare®, Xen®, and others. Linux KVM is a virtual memory system, meaning that addresses seen by programs loaded and executed in system memory are virtual memory addresses that have to be mapped or translated to physical memory addresses of the physical memory. This layer of indirection enables a program running on network device 100 to have an allocated virtual memory space that is larger than the system's physical memory.

In the example depicted in FIG. 1, the memory space allocated to operating system 110 (operating as a hypervisor) is divided into a kernel space 112 and a user space 114 (also referred to as host user space). Multiple virtual machines and host processes may be loaded into user space 114 and executed by processors 102. The memory allocated to a virtual machine (also sometimes referred to as a guest operating or GOS) may in turn include a guest kernel space portion and a guest user space portion. A virtual machine may have its own operating system loaded into the guest kernel space of the virtual machine. A virtual machine may operate independently of other virtual machines executed by network device 100 and may be unaware of the presence of the other virtual machines.

A virtual machine's operating system may be the same as or different from the host operating system 110. When multiple virtual machines are being executed, the operating system for one virtual machine may be the same as or different from the operating system for another virtual machine. In this manner, hypervisor 110 enables multiple guest operating systems to share the hardware resources (e.g., processor and memory resources) of network device 100.

For example, in the embodiment depicted in FIG. 1, two virtual machines VM-1 116 and VM-2 118 have been loaded into user space 114 and are being executed by processors 102. VM-1 116 has a guest kernel space 126 and a guest user space 124. VM-2 118 has its own guest kernel space 130 and guest user space 128. Typically, each virtual machine has its own secure and private memory area that is accessible only to that virtual machine. In certain implementations, the creation and management of virtual machines 116 and 118 may be managed by hypervisor 110, which may be, for example, KVM. While only two virtual machines are shown in FIG. 1, this is not intended to be limiting. In alternative embodiments, any number of virtual machines may be loaded and executed.

Various other host programs or processes may also be loaded into user space 114 and be executed by processors 102. For example, as shown in the embodiment depicted in FIG. 1, two host processes 120 and 122 have been loaded into user space 114 and are being executed by processors 102. While only two host processes are shown in FIG. 1, this is not intended to be limiting. In alternative embodiments, any number of host processes may be loaded and executed.

In certain embodiments, a virtual machine may run a network operating system (NOS) (also sometimes referred to as a network protocol stack) and be configured to perform processing related to forwarding of packets from network device 100. As part of this processing, the virtual machine may be configured to maintain and manage routing information that is used to determine how a data packet received by network device 100 is forwarded from network device 100. In certain implementations, the routing information may be stored in a routing database (not shown) stored by network device 100. The virtual machine may then use the routing information to program a packet processor 106, which then performs packet forwarding using the programmed information, as described below.

The virtual machine running the NOS may also be configured to perform processing related to managing sessions for various networking protocols being executed by network device 100. These sessions may then be used to send signaling packets (e.g., keep-alive packets) from network device 100. Sending keep-alive packets enables session availability information to be exchanged between two ends of a forwarding or routing protocol.

In certain implementations, redundant virtual machines running network operating systems may be provided to ensure high availability of the network device. In such implementations, one of the virtual machines may be configured to operate in an "active" mode (this virtual machine is referred to as the active virtual machine) and perform a set of functions while the other virtual machine is configured to operate in a "standby" mode (this virtual machine is referred to as the standby virtual machine) in which the set of functions performed by the active virtual machine are not performed. The standby virtual machine remains ready to take over the functions performed by the active virtual machine. Conceptually, the virtual machine operating in active mode is configured to perform a set of functions that are not performed by the virtual machine operating in standby mode. For example, the virtual machine operating in active mode may be configured to perform certain functions related to routing and forwarding of packets from network device 100, which are not performed by the virtual machine operating in standby mode. The active virtual machine also takes ownership of and manages the hardware resources of network device 100.

Certain events may cause the active virtual machine to stop operating in active mode and for the standby virtual machine to start operating in the active mode (i.e., become the active virtual machine) and take over performance of the set of functions related to network device 100 that are performed in active mode. The process of a standby virtual machine becoming the active virtual machine is referred to as a failover or switchover. As a result of the failover, the virtual machine that was previously operating in active mode prior to the failover may operate in the standby mode after the failover. A failover enables the set of functions performed in active mode to be continued to be performed without interruption. Redundant virtual machines used in this manner may reduce or even eliminates the downtime of network device's functionality, which may translate to higher availability of network device 100. The set of functions that is performed in active mode, and which is not performed by the active virtual machine and not performed by the standby virtual machine may differ from one network device to another.

Various different events may cause a failover to occur. Failovers may be voluntary or involuntary. A voluntary failover may be purposely caused by an administrator of the network device or network. For example, a network administrator may, for example, using a command line instruction, purposely cause a failover to occur. There are various situations when this may be performed. As one example, a voluntary failover may be performed when software for the active virtual machine is to be brought offline so that it can be upgraded. As another example, a network administrator may cause a failover to occur upon noticing performance degradation on the active virtual machine or upon noticing that software executed by the active computing domain is malfunctioning.

An involuntary failover typically occurs due to some critical failure in the active virtual machine. This may occur, for example, when some condition causes the active virtual machine to be rebooted or reset. This may happen, for example, due to a problem in the virtual machine kernel, critical failure of software executed by the active virtual machine, and the like. An involuntary failover causes the standby virtual machine to automatically become the active virtual machine.

In the example depicted in FIG. 1, VM-1 116 is shown as operating in active mode and VM-2 118 is shown as operating in standby mode. The active-standby model enhances the availability of network device 100 by enabling the network device to support various high-availability functionality such as graceful restart, non-stop routing (NSR), and the like.

During normal operation of network device 100, there may be some messaging that takes place between the active virtual machine and the standby virtual machine. For example, the active virtual machine may use messaging to pass network state information to the standby virtual machine. The network state information may comprise information that enables the standby virtual machine to become the active virtual machine upon a failover or switchover in a non-disruptive manner. Various different schemes may be used for the messaging, including but not restricted to Ethernet-based messaging, Peripheral Component Interconnect (PCI)-based messaging, shared memory based messaging, and the like.

Hardware resources 108 or devices may include without restriction one or more field programmable gate arrays (FPGAs), application specific integrated circuits (ASICs), I/O devices, and the like. I/O devices may include devices such as Ethernet devices, PCI Express (PCIe) devices, and others. In certain implementations, some of hardware resources 108 may be partitioned between multiple virtual machines executed by network device 100 or, in some instances, may be shared by the virtual machines. One or more of hardware resources 108 may assist the active virtual machine in performing networking functions. For example, in certain implementations, one or more FPGAs may assist the active virtual machine in performing the set of functions performed in active mode.

As previously indicated, network device 100 may be configured to receive and forward packets to facilitate delivery of the packets to their intended destinations. The packets may include data packets and signal or protocol packets (e.g., keep-alive packets). The packets may be received and/or forwarded using one or more ports 107. Ports 107 represent the I/O plane for network device 100. A port within ports 107 may be classified as an input port or an output port depending upon whether network device 100 receives or transmits a packet using that port. A port over which a packet is received by network device 100 may be referred to as an input port. A port used for communicating or forwarding a packet from network device 100 may be referred to as an output port. A particular port may function both as an input port and an output port. A port may be connected by a link or interface to a neighboring network device or network. In some implementations, multiple ports of network device 100 may be logically grouped into one or more trunks.

Ports 107 may be capable of receiving and/or transmitting different types of network traffic at different speeds, such as speeds of 1 Gigabits per second (Gbps), 10 Gbps, 100 Gbps, or more. Various different configurations of ports 107 may be provided in different implementations of network device 100. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

In certain implementations, upon receiving a data packet via an input port, network device 100 is configured to determine an output port to be used for transmitting the data packet from network device 100 to facilitate communication of the packet to its intended destination. Within network device 100, the packet is forwarded from the input port to the determined output port and then transmitted or forwarded from network device 100 using the output port.

Various different components of network device 100 are configured to cooperatively perform processing for determining how a packet is to be forwarded from network device 100. In certain embodiments, packet processor 106 may be configured to perform processing to determine how a packet is to be forwarded from network device 100. In certain embodiments, packet processor 106 may be configured to perform packet classification, modification, forwarding and Quality of Service (QoS) functions. As previously indicated, packet processor 106 may be programmed to perform forwarding of data packets based upon routing information maintained by the active virtual machine. In certain embodiments, upon receiving a packet, packet processor 106 is configured to determine, based upon information extracted from the received packet (e.g., information extracted from a header of the received packet), an output port of network device 100 to be used for forwarding the packet from network device 100 such that delivery of the packet to its intended destination is facilitated. Packet processor 106 may then cause the packet to be forwarded within network device 100 from the input port to the determined output port. The packet may then be forwarded from network device 100 to the packet's next hop using the output port.

In certain instances, packet processor 106 may be unable to determine how to forward a received packet. Packet processor 106 may then forward the packet to the active virtual machine, which may then determine how the packet is to be forwarded. The active virtual machine may then program packet processor 106 for forwarding that packet. The packet may then be forwarded by packet processor 106.

In certain implementations, packet processing chips or merchant ASICs provided by various third-party vendors may be used for packet processor 106 depicted in FIG. 1. For example, in some embodiments, Ethernet switching chips provided by Broadcom® or other vendors may be used. For example, in some embodiments, Qumran ASICs may, for example, be used in a pizza-box implementation, or Jericho packet processor chips (BCM88670) may, for example, be used in a chassis-based system, or other ASICs provided by Broadcom® may be used as packet processor 106. In alternative implementations, chips from other vendors may be used as packet processor 106.

Figure 2:
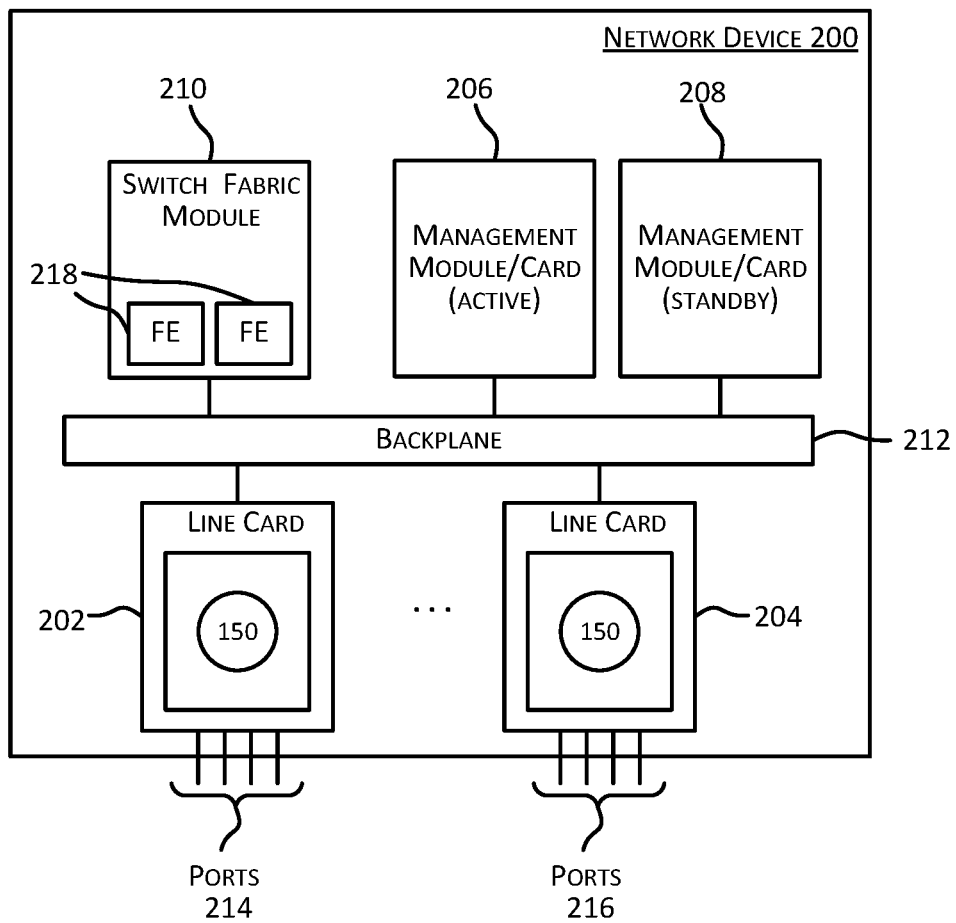
FIG. 2 is a simplified block diagram of yet another example network device.

FIG. 2 is a simplified block diagram of another example network device 200. Network device 200 depicted in FIG. 2 is commonly referred to as a chassis-based system (network device 100 depicted in FIG. 1 is sometimes referred to as a "pizza-box" system). Network device 200 may be configured to receive and forward packets, which may be data packets or signaling or protocol-related packets (e.g., keep-alive packets). Network device 200 comprises a chassis that includes multiple slots, where a card or blade or module can be inserted into each slot. This modular design allows for flexible configurations, with different combinations of cards in the various slots of the network device for supporting differing network topologies, switching needs, and performance requirements.

In the example depicted in FIG. 2, network device 200 comprises multiple line cards (including first line card 202 and a second line card 204), two management cards/modules 206, 208, and one or more switch fabric modules (SFMs) 210. A backplane 212 is provided that enables the various cards/modules to communicate with each other. In certain embodiments, the cards may be hot swappable, meaning they can be inserted and/or removed while network device 200 is powered on. In certain implementations, network device 200 may be a router or a switch such as various routers and switches provided by Brocade Communications Systems, Inc. of San Jose, Calif.

Network device 200 depicted in FIG. 2 is merely an example and is not intended to unduly limit the scope of inventive embodiments recited in the claims. One of ordinary skill in the art would recognize many variations, alternatives, and modifications. For example, in some embodiments, network device 200 may have more or fewer components than shown in FIG. 2, may combine two or more components, or may have a different configuration or arrangement of components.

In the example depicted in FIG. 2, network device 200 comprises two redundant management modules 206, 208. The redundancy enables the management modules to operate according to the active-standby model, where one of the management modules is configured to operate in standby mode (referred to as the standby management module) while the other operates in active mode (referred to as the active management module). The active management module may be configured to perform management and control functions for network device 200 and may represent the management plane for network device 200. The active management module may be configured to execute applications for performing management functions such as maintaining routing tables, programming the line cards (e.g., downloading information to a line card that enables the line card to perform data forwarding functions), and the like. In certain embodiments, both the management modules and the line cards act as a control plane that programs and makes programming decisions for packet processors in a network device. In a chassis-based system, a management module may be configured as a coordinator of multiple control planes on the line cards.

When a failover or switchover occurs, the standby management module may become the active management module and take over performance of the set of functions performed by a management module in active mode. The management module that was previously operating in active mode may then become the standby management module. The active-standby model in the management plane enhances the availability of network device 200, allowing the network device to support various high-availability functionality such as graceful restart, non-stop routing (NSR), and the like.

In the example depicted in FIG. 2, management module 206 is shown as operating in active mode and management module 208 is shown as operating in standby mode. Management modules 206 and 208 are communicatively coupled to the line cards and switch fabric modules (SFMs) 210 via backplane 212. Each management module may comprise one or more processors, which could be single or multicore processors and associated system memory. The processors may be general purpose microprocessors such as ones provided by Intel®, AMD®, ARM®, Freescale Semiconductor, Inc., and the like, which operate under the control of software stored in associated memory.

A switch fabric module (SFM) 210 may be configured to facilitate communications between the management modules 206, 208 and the line cards of network device 200. There can be one or more SFMs in network device 200. Each SFM 210 may include one or more fabric elements (FEs) 218. The fabric elements provide an SFM the ability to forward data from an input to the SFM to an output of the SFM. An SFM may facilitate and enable communications between any two modules/cards connected to backplane 212. For example, if data is to be communicated from one line card 202 to another line card 204 of network device 200, the data may be sent from the first line card to SFM 210, which then causes the data to be communicated to the second line card using backplane 212. Likewise, communications between management modules 206, 208 and the line cards of network device 200 are facilitated using SFMs 210.

In the example depicted in FIG. 2, network device 200 comprises multiple line cards including line cards 202 and 204. Each line card may comprise a set of ports 214, 216 that may be used for receiving and forwarding packets. The ports 214, 216 of a line card may be capable of receiving and/or transmitting different types of network traffic at different speeds, such as speeds of 1 Gbps, 10 Gbps, 100 Gbps, or more. Various different configurations of line card ports 214, 216 may be provided in network device 200. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

Each line card may include one or more single or multicore processors, a system memory, a packet processor, and one or more hardware resources. In certain implementations, the components on a line card may be configured similar to the components of network device 100 depicted in FIG. 1 (components collectively represented by reference 150 from FIG. 1 and also shown in line cards 202, 204 in FIG. 2).

A packet may be received by network device 200 via a port on a particular line card. The port receiving the packet may be referred to as the input port and the line card as the source/input line card. The packet processor on the input line card may then determine, based upon information extracted from the received packet, an output port to be used for forwarding the received packet from network device 200. The output port may be on the same input line card or on a different line card. If the output port is on the same line card, the packet is forwarded by the packet processor on the input line card from the input port to the output port and then forwarded from network device 200 using the output port. If the output port is on a different line card, then the packet is forwarded from the input line card to the line card containing the output port using backplane 212. The packet is then forwarded from network device 200 by the packet processor on the output line card using the output port.

In certain instances, the packet processor on the input line card may be unable to determine how to forward a received packet. The packet processor may then forward the packet to the active virtual machine on the line card, which then determines how the packet is to be forwarded. The active virtual machine may then program the packet processor on the line card for forwarding that packet. The packet may then be forwarded to the output port (which may be on the input line card or some other line card) by that packet processor and then forwarded from network device 200 using via the output port.

In certain instances, the active virtual machine on an input line card may be unable to determine how to forward a received packet. The packet may then be forwarded to the active management module, which then determines how the packet is to be forwarded. The active management module may then communicate the forwarding information to the line cards, which may then program their respective packet processors based upon the information. The packet may then be forwarded to the line card containing the output port (which may be on the input line card or some other line card) and then forwarded from network device 200 using via the output port.

To send or receive packets for a network device, a packet processor may provide Direct Memory Access (DMA) functionality. With DMA, the packet processor can transfer a packet to or from the physical memory of a network device without needing assistance from the network devices processor(s).

Figure 3:
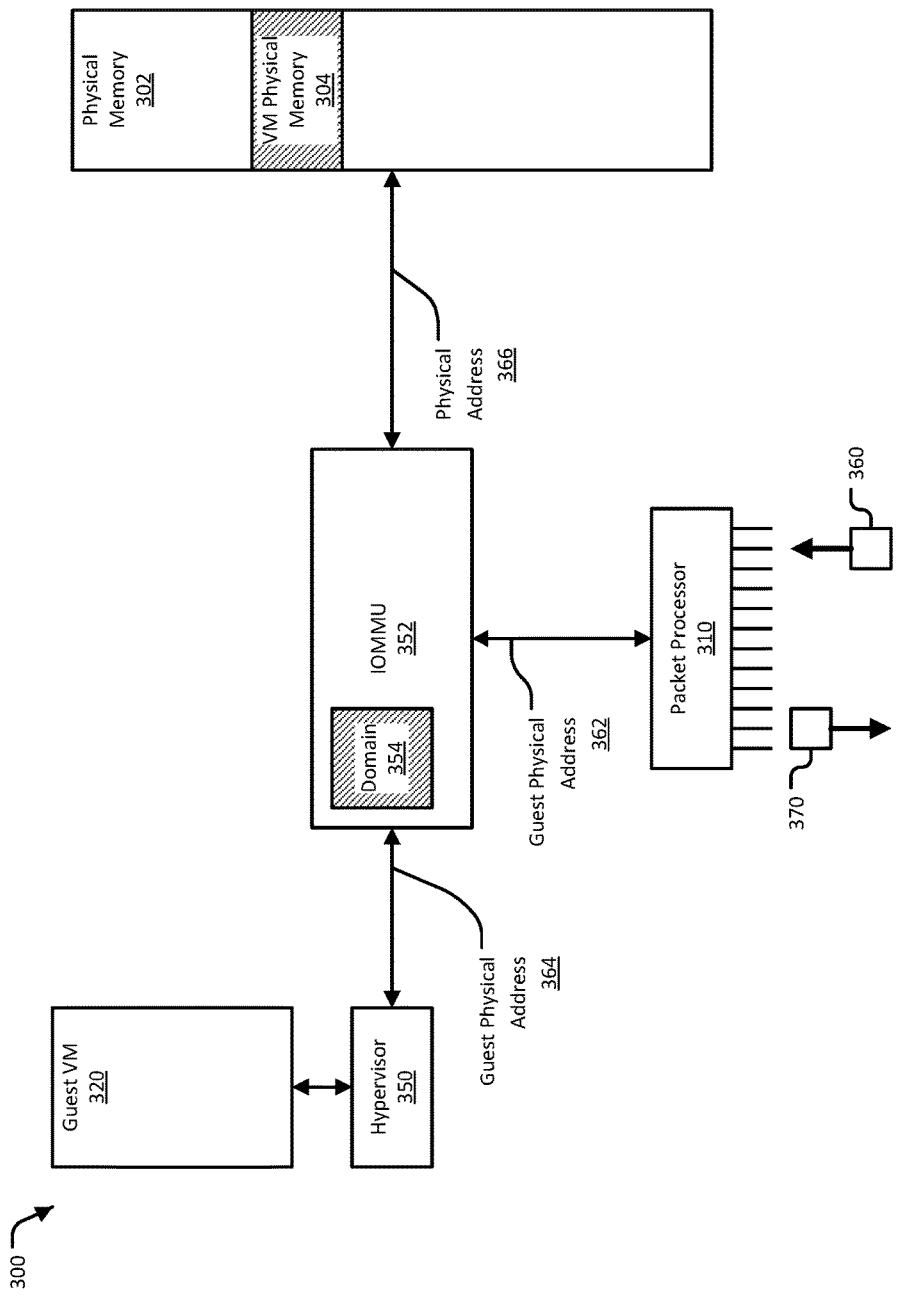
FIG. 3 illustrates an example of a network device that includes a packet processor that provides DMA functionality for receiving and transmitting packets.

FIG. 3 illustrates an example of a network device 300 that includes a packet processor 310 that provides DMA functionality for receiving and transmitting packets. The network device 300 can include a guest virtual machine 320, which may be running a network operating system. The network device's operational environment can also include a hypervisor 350 that supports the guest virtual machine 320, including providing the guest virtual machine 320 with access to the hardware resources of the network device 300. The network device 300 can also include an IOMMU that provides address translations between host processes, such as the guest virtual machine 320, and I/O devices, such as the packet processor 310. The network device 300 can also include physical memory 302.

Generally, when the guest virtual machine 320 is initiated, the network device 300 (e.g., through the hypervisor 350 or a host operating system) can allocate a physical memory region in the physical memory 302, referred to here as the VM physical memory 304. The VM physical memory region 304 can be the part of physical memory 302 that is assigned to the guest virtual machine 320 for its exclusive use. The VM physical memory region 304 can be read and written using physical addresses.

The operating system and applications executing within the guest virtual machine 320 generally use virtual addresses. A virtual machine is "virtual" in the sense that, from the perspective of the operating system and applications running within the virtual machine, the virtual machine appears indistinguishable from a physical machine. The virtual machine thus has an address space that is distinct from the address space of the network device 300, which is commonly referred to as a virtual address space. Within the virtual address space, addresses that, in the network device 300, map to physical resources can be referred to as guest physical addresses.

Memory read and write transactions from the guest virtual machine 320 can be guest physical addresses 364. These transactions can be received by the hypervisor 350, which can be configured to pass the transactions to the appropriate hardware resource. In the illustrated example, the hardware resources include the physical memory 302. Because the physical memory 302 is addressed using physical addresses 366, the network device 300 can include a memory management unit (not illustrated here) and/or an IOMMU 352 to translate from the virtual, guest physical addresses 364 to physical addresses 366.

An IOMMU is a hardware and/or software module that can be configured to execute various address translations. For example, the IOMMU 352 can be configured with an I/O virtual address space, which can also be called an address map or domain 354. The domain 354 can describe all of the I/O address space that is available to the guest virtual machine 320. The guest virtual machine 320 can allocate regions in the domain to specific I/O devices, including the packet processor 310. A region in the domain 354 can have a corresponding region in physical memory 302. This region in physical memory 302 can, for example, be assigned to the packet processor 310 (or other I/O device) for the packet processor's memory needs. The region in the domain 354 that is assigned to the packet processor 310 can be used to translate between the guest physical addresses 364 used by the guest virtual machine 320 and the physical addresses 366 in the physical memory 302.

The IOMMU 352 can provide resource exclusivity and isolation. For example, the domain 354 can usually only be assigned to one entity, such as the guest virtual machine 320 or the host operating system. Additionally, the domain 354 can usually only translate from one address space to another address space; thus, when the domain 354 is assigned to the guest virtual machine 320, the domain 354 can only translate from the guest physical addresses 364 of the guest virtual machine 320 to, for example, physical addresses 366 in the physical memory 302. In this way, only the guest virtual machine 320 is able to use the packet processor 310. This exclusivity may increase the efficiency of I/O transactions through the packet processor 310.

As noted above, the packet processor 310 can support DMA operations for transmitting and receiving packets. For example, when the guest virtual machine 320 has a packet 370 for transmitting, the guest virtual machine 320 can write the packet 370 into physical memory 302, and then request that the packet processor 310 send the packet. The guest virtual machine 320 may then move on to other operations while the packet processor 310 executes a DMA operation to transmit the packet 370.

Because the guest virtual machine 320 operates using guest virtual addresses, when the guest virtual machine 320 writes the packet 370 to physical memory 302, the write transaction will use a guest physical address 364. Generally, this translation is handled by a memory management unit that is part of or coupled to a processor in the network device 300. The memory management unit can provide a physical address 366 that can be used to write the packet 370 into the physical memory 302. More specifically, the packet 370 would be written into the VM physical memory 304. Once the packet 370 is written into physical memory 302, the guest virtual machine 320 can inform the packet processor 310 that there is a packet ready to be transmitted. For example, the guest virtual machine 320 can write a register in the packet processor 310, where a write to the register indicates to the packet processor 310 that there is a packet ready to be sent. In some implementations, the guest virtual machine 320 may write, to the packet processor 310, the guest physical address where the packet 370 can be found in physical memory 302.

In some implementations, the guest virtual machine 320 can provide the location in the physical memory 302 of the packet 370 in advance of informing the packet processor 310 that the packet 370 is ready for transmission, and/or before placing the packet 370 in the physical memory 302. For example, in some implementations, the guest virtual machine 320 can write one or more addresses to the packet processor 310, which the packet processor 310 understands as locations at which to find packets when the guest virtual machine 320 requests packet transmission. In this example, upon receiving such a request from the guest virtual machine 320, the packet processor 310 can use these pre-loaded addresses to read packets from the physical memory 302.

Whether programmed in advance or received with a request to transmit the packet 370, the addresses given to the packet processor 310 will be guest physical addresses 364 within the virtual address space of the guest virtual machine 320. This is because the processes within the guest virtual machine 320 only know the virtual address space. Hence, the packet processor 310 can use the IOMMU to translate the guest physical address 362 into a physical address 366. The IOMMU can then use the physical address 366 to read the packet 370 from the physical memory 302. Because the packet processor 310 executes a DMA transaction to obtain the packet 370, any processor in the network device 300 need not be involved. Once the packet processor 310 has read the packet 370 from the physical memory 302, the packet processor 310 can transmit the packet 370.

As another example, when a packet 360 is received by the network device 300, the packet processor 310 can write the packet 360 into the physical memory 302. The address at which the packet 360 is written can also be programed into the packet processor 310 by the guest virtual machine 320. Consequently, this address will also be a guest physical address 362, which the packet processor 310 can translate into a physical address 366 using the IOMMU 352. The packet processor 310 can then use this physical address 366 to write the packet 360 into physical memory 302. The packet processor 310 uses a DMA operation to execute this write; hence any processor in the network device 300 is not used.

Once the packet 360 is in physical memory 302, the packet processor 310 can inform the guest virtual machine 320 a packet 360 has been received. For example, the packet processor 310 can send an interrupt signal. Upon receiving such a notification, the guest virtual machine 320 can read the packet 360 from physical memory 302, using a guest physical address 364. Generally, the guest physical address 364 is translated into a physical address 366 using a memory management unit coupled to or incorporated into a processor. This physical address 366 can be used to read the packet 360 from physical memory 302. The packet 360 may then be delivered to the guest virtual machine 320.

In various implementations of a network device, at least two host processes in the network device may be sending and/or receiving packets at the same time. For example, the network device can include a virtual machine that manages the operations of the network device, including managing transmission and receipt of packets. As a further example, the network device can also include a host process that is often referred to as a software keep-alive process. Routers and similar network devices send periodic "keep-alive" packets to maintain the health and status of various protocol sessions. Periodic keep-alive packets indicate to devices using a particular link provided by the router that the link is available for use. When the keep-alive packets stop, the devices may assume that the link has gone down, and may then terminate any network sessions that were using that link.

A router may have dedicated hardware that issues keep-alive packets. Hardware implementations may be robust, in that the dedicated hardware is typically unaffected by the state of the router's management software. Hardware implementations, however, may be less flexible and un-scalable. For example, a hardware implementation may not be easily reconfigured for different numbers of line cards or different numbers of ports.

A software keep-alive process can be more flexible and scalable than a hardware keep-alive implementation. A software keep-alive process, however, may be affected by the state of the network device's management software. For example, the software keep-alive process can be running in the same virtual machine that is running a network operating system for the network device. Should the virtual machine become disabled—such as could occur during a failover or switchover event—the software keep-alive process would also become disabled. This can result in an interruption of transmission of the period keep-alive packets. While a new virtual machine, in which a new keep-alive process can be initiated, may immediately take over the operation of the network device, the span of time until this occurs may be long enough that protocol sessions may be needlessly terminated.

In various implementations, to provide a software keep-alive process that may be as consistent and robust as a hardware implementation, the software keep-alive process can be launched as an independent host process, outside of the virtual machine that is running the network operating system. As an independent host process, the software keep-alive process can be unaffected should the virtual machine become disabled, and can continue to send keep-alive packets while a new virtual machine takes over the operations of the network device.

In various implementations, a virtual machine may itself be sending and/or transmitting packets at the same time that the software keep-alive process is sending packets. Both the virtual machine and the software keep-alive process may be using the same high-performance packet processor as an interface to the network.

In various implementations, a high-performance packet processor can be shared between host processes, through software configuration and/or hardware support. Not all of these methods are available in all instances, however, and some may affect the performance capability of the packet processor. For example, using a software configuration, the high-performance packet processor can be assigned to a host process, such as a host operating system for a network device. In this example, multiple virtual machines may be running on top of the host operating system. Should two or more of these virtual machines be sending and/or receiving packets, the host operating system can then provide a conduit through which the packets can reach a packet processor. Delay may be caused, however, by passing transactions through the host operating system. For example, outbound packets may need to be moved from physical memory assigned to a virtual machine to physical memory that is accessible to the host operating system. In this example, the packet can then be transmitted from the host operating system's physical memory. A similar movement from one location in physical memory to another location in physical memory can occur with inbound packets. In these and other examples, a software configuration may limit the throughput through the packet processor.

Figure 4:
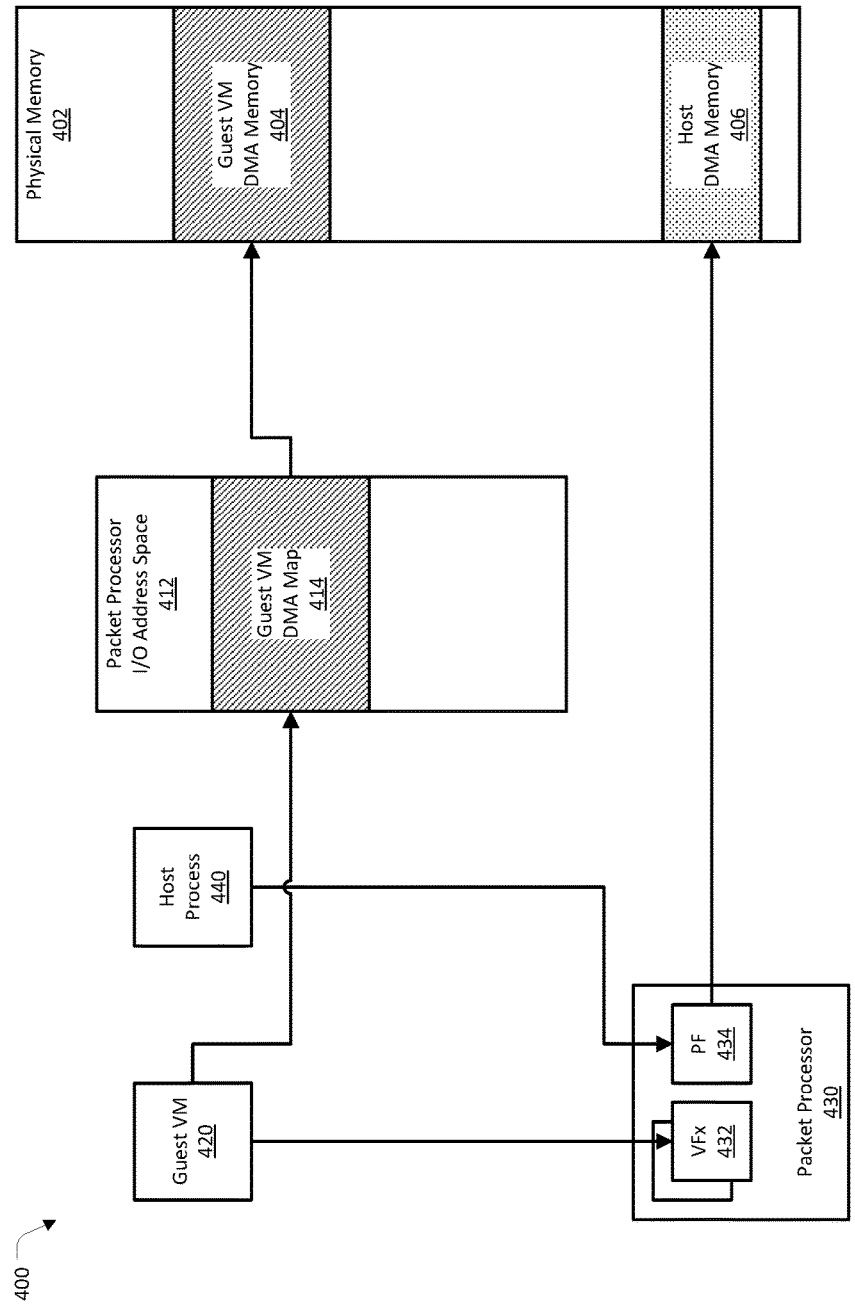
FIG. 4 illustrates an example of a network device that is configured to share a packet processor, where the packet processor supports hardware virtualization.

A combined hardware and software configuration may enable higher throughput through a packet processor. FIG. 4 illustrates an example of a network device 400 that includes a packet processor 430 that includes hardware virtualization, which can enable the packet processor 430 to be shared between multiple host processes. In this example, the packet processor 430 is a Peripheral Component Interconnect (PCI) type device, and includes Single Root Input/Output Virtualization (SR-IOV). SR-IOV enables the packet processor 430 to be used simultaneously by multiple host processes, including virtual machines. The packet processor 430 can have a physical function 434, such as for example a DMA engine that can be used to send or receive packets. The packet processor 430 can also have multiple virtual functions 432, where each virtual function 432 provides the same capabilities as the physical function 434. While the physical function 434 typically includes hardware and/or software necessary to implement a function (such as DMA), the virtual functions 432 do not, and instead use the hardware and/or software provided by the physical function 434. A PCI-type device can have many virtual functions for a given physical function, such as for example 32 or 64 virtual functions, which provide the same functionality as the physical function.

The virtual functions 432 can be assigned to various host processes, such as a guest virtual machine 420. To the guest virtual machine 420, the virtual function 432 may appear no different than the physical function 434, and the guest virtual machine 420 can use the virtual function 432 as if it is using the physical function 434. The guest virtual machine 420 may have a device driver through which it can access the virtual function 432.

In this example, the network device 400 has multiple host processes that send and/or receive packets, including the guest virtual machine 420 and a host process 440. The guest virtual machine 420 may be running a network operating system, and may be sending and/or receiving packets. The host process 440 may also be sending and/or receiving packets. For example, the host process 440 can be a software keep-alive process, and may periodically send keep-alive packets to the network.

As discussed above, the guest virtual machine 420 generally uses virtual addresses, which may also be referred to as guest physical addresses, to access physical memory 402. To translate guest physical addresses to physical addresses, a packet processor I/O virtual address space 412 can be configured for the guest virtual machine 420. In various implementations, the I/O virtual address space 412 provides address translations for read and write transactions from the guest virtual machine 420 that are directed to the packet processor. There may be a corresponding guest VM DMA memory 404 allocated in physical memory 402. The I/O virtual address space 412 thus provides a mapping of guest physical addresses to physical addresses in the guest VM DMA memory 404. In various implementations, the I/O virtual address space 412 can be configured in a memory management unit, which can provide the facilities to automatically execute the translations. The I/O virtual address space 412 may also be referred to as a domain.

For transmitting and receiving packets through the packet processor 430, the guest virtual machine 420 can allocate a region of the I/O virtual address space 412, which is referred to in the illustrated example as the guest VM DMA map 414. The guest virtual machine 420 can further associate the guest VM DMA map 414 with the virtual function device driver. The virtual function 432 that is assigned to the guest virtual machine 420 can then use the guest VM DMA map 414 to execute DMA operations, such as for example reading and writing packets that are to be transmitted or are received, respectively.

In this example, a host process 440 can also be sending and transmitting packets using the packet processor's DMA functionality. For the host process 440 to make use of the packet processor 430, in this example, a host DMA memory 406 has been allocated in physical memory 402. Inbound and outbound packets for the host process 440 can be placed in this host DMA memory 406, and the packet processor 430 can read or write packets from the host DMA memory 406, using DMA operations.

When the host process 440 is to transmit a packet, the host process 440 can write the packet to the host DMA memory 406 in physical memory. Because the host process 440 is executing within the host operating system, rather than in a virtual machine, the host process 440 will be using physical addresses. Thus, the host process 440 can write the packet directly to the host DMA memory 406 without needing to do an address translation. Once the packet is in the host DMA memory 406, the host process 440 can request that the packet processor's physical function 434 transmit the packet. In most cases, the physical function 434 can be accessed directly from the host operating system. Once the host process 440 has requested that physical function 434 transmit the packet, the host process 440 may proceed to other operations, while the packet processor 430 reads the packet from physical memory 402 and transmits the packet.

When a packet is received for the guest virtual machine 420, the packet processor 430 can write the packet into the guest VM DMA memory 404. The packet processor 430 can use the virtual function 432 that is assigned to the guest virtual machine 420. The virtual function 432 can be programmed with the guest physical address that the packet processor 430 should use to write the packet into the guest VM DMA memory 404. Additionally, the virtual function 432 can cause the write from the packet processor 430 to be translated using the guest VM DMA map 414. Once the packet is in physical memory 402, the packet processor 430 can inform the guest virtual machine 420 that the packet is ready. The guest virtual machine 420 can then, using a guest physical address, read the packet. The address for this read transaction can be translated, using a memory management unit, to a physical address that can be used to read the physical memory 402.

Not all packet processors, however, have SR-IOV capabilities. Without SR-IOV, a network device can use other hardware and/or software to enable a high-performance packet processor to be shared, without impacting the packet processor's high-performance capabilities.

An I/O device, such as a packet processor, can include several different address spaces, each of which can be accessible to two or more host processes that are sharing packet processors. These address spaces can include an address space for configuration registers and a more general memory address space. The configuration address space can be accessed by host processes to configure the packet processor, send interrupts to the packet processor, read interrupt information, and/or provide information for executing DMA transactions (e.g., an address from which to read a packet or to which to write a packet), among other things. The memory address space can correspond to the memory of the packet processor and/or to memory assigned to the packet processor in the physical memory 502. The host processes can use the memory address space to write and read packets to and from the physical memory 502 assigned to the packet processor. The packet processor can execute DMA operations to also read and write these packets. In various implementations, the packet processor's memory address space can be virtualized, for efficiency and/or ease of access.

Shared access to the packet processor's control registers can be provided by a Memory Mapped I/O (MMIO) mechanism. In an MMIO system, processor memory (e.g., RAM) and the registers of I/O devices can be mapped into one address space. A network device's processor(s) can thus access a packet processor's control registers in the same way that the processor(s) can access main memory. Because the host processes that are to share the packet processor are both operating within the host system's host operating system, they both can, through an MMIO mechanism, access the packet processor's control registers.

Figure 5:
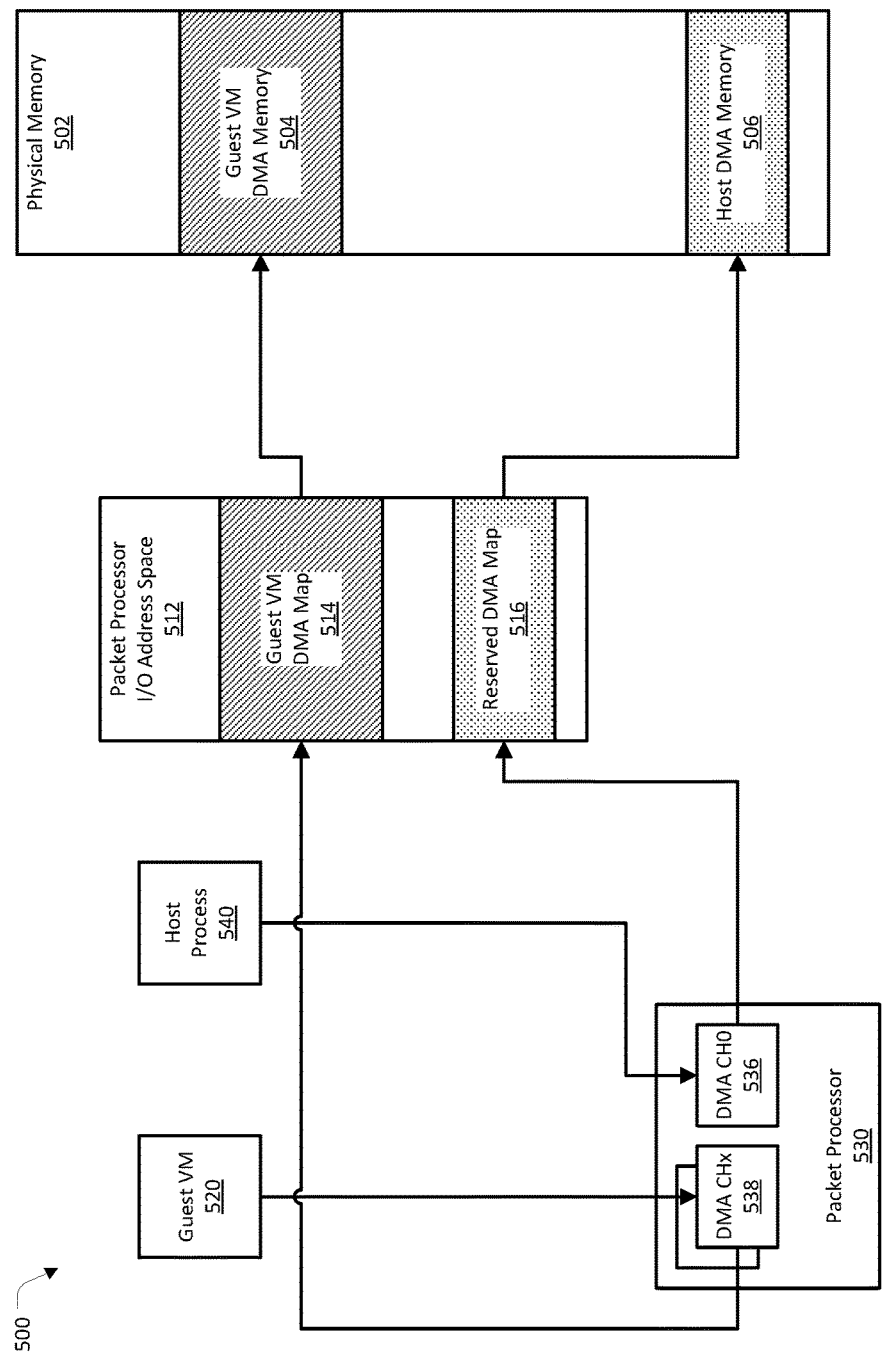
FIG. 5 illustrates an example of a network device that includes a high-performance packet processor, which may be assigned by the network device to multiple host processes.

Shared access of the memory address space of the packet processor can be accomplished by making use of IOMMU domain sharing capabilities and the multiple DMA channels that are provided by most packet processors. FIG. 5 illustrates an example of a network device 500 that includes a high-performance packet processor 530. The example network device 500 further includes a guest virtual machine 520. In various implementations, the guest virtual machine 520 may be executing a network operating system for managing the operations of the network device 500. The guest virtual machine 520 can include a device driver, through which the guest virtual machine 520 can use the packet processor 530. The network device 500 of this example also includes a host process 540 that may be sending and/or receiving packets. For example, in some implementations, the host process 540 is a software keep-alive process that periodically sends keep-alive packets.

As discussed above, the network device 500 can be configured with a packet processor I/O virtual address space 512 that can be used by the guest virtual machine 520 for I/O transactions to the packet processor 430. The I/O virtual address space 512 can describe all I/O addresses that are available to the guest virtual machine 520. The I/O virtual address space 512 can also be referred to as an address map or domain. Typically, the I/O virtual address space 512 is configured when the guest virtual machine 520 is initiated. For example, when the guest virtual machine 520 is launched, the network device 500 can instruct a memory management unit to set up the I/O virtual address space 512. In this example, the instruction can come from a hypervisor that supports the guest virtual machine 520 or from the host operating system.

Once the guest virtual machine 520 is up and running, the guest virtual machine 520 can allocate a region in the I/O virtual address space 512, here designated as the guest VM DMA map 514, which the guest virtual machine 520 can assign to the packet processor 530. The network device 500 can allocate a corresponding region in the physical memory, here designated the guest VM DMA memory 504. The guest VM DMA memory 504 can be assigned to the packet processor 530 as a region accessible to the packet processor for DMA transactions. The guest VM DMA space 514 can provide address translations between the virtual addresses the guest virtual machine 520 would use to access the packet processor 530, and the physical addresses needed to access the guest VM DMA memory 504. The guest virtual machine 520 can similarly allocate regions in the I/O virtual address space 512 for other I/O devices. In various implementations, the I/O virtual address space 512 can be configured in an IOMMU, which may provide the translation mechanism.

The packet processor 530 can have multiple DMA channels 536, 538, such as for example four or eight channels. The guest virtual machine 520 typically only needs one DMA channel to send and/or receive packets. Thus, in various implementations, one of the packet processor's 530 DMA channels 538 can be assigned to the guest VM DMA map 514. When the packet processor 530 receives a packet for the guest virtual machine 520, the packet processor 530 can use this first DMA channel 538 to write the packet into physical memory 502. As discussed above, the guest virtual machine 520 may have configured the packet processor 530 with a guest physical address to use when writing an inbound packet. Thus, through the designated DMA channel 538, the packet processor's 530 write transaction can be translated using the guest VM DMA map 514. Once the packet is in physical memory 502, the packet processor 530 can inform the guest virtual machine 520 that the packet is ready.

For the host process 540 to share the packet processor 530 with the guest virtual machine 520, the host process 540 can use another of the packet processor's 530 DMA channels 536. To do so, a region of the I/O virtual address space 512 is reserved for DMA operations by the host operating system. This region is designated, in the illustrated example, as the reserved DMA map 516. This reserved DMA map 516 can be assigned to a second DMA channel 536. The I/O virtual address space 512, however, as a whole remains assigned to the guest virtual machine 520. By reserving a region of the I/O virtual address space for the host process 540, the guest virtual machine 520 is only prevented from using the reserved DMA map 516 when allocating the guest VM DMA map 514. The guest virtual machine 520 can instead use unreserved parts of the I/O virtual address space 512.

Because the reserved DMA map 516 is in the I/O virtual address space 512, the reserved DMA map 516 also maps guest physical addresses (as would be used by the guest virtual machine 520) into physical addresses. The reserved DMA map 516, in this example, is configured to map guest physical addresses into a host DMA map 506, allocated in physical memory 502 for use by the host operating system. When the host process 540 transmits a packet, the host process 540 can, first, write the packet into the host DMA map 506 using a guest physical address. The guest physical address can be mapped into a physical address, using the reserved DMA map 516. Once the packet is in physical memory 502, the host process 540 can inform the packet processor, through its assigned DMA channel 536, that the packet is ready for transmission. The DMA channel 536, through its assignment to the reserved DMA map 516, can obtain the physical address for the packet, read the packet, and then transmit the packet.

By reserving the reserved DMA map 516 in the I/O virtual address space 512 of the guest virtual machine 520, the host process 540 is provided with access to the packet processor 530. The guest virtual machine's 520 exclusive use of the packet processor 530 is not interfered with, because the guest virtual machine 520 continues to have a dedicated DMA channel 538. Additionally, the guest virtual machine 520 continues to be able to use the packet processor 530 directly, rather than through an indirect means, such as through the host operating system.

In various implementations, the I/O virtual address space 512 is preserved independently of any processes that are using the I/O virtual address space 512. The network device 500 is configured to maintain the I/O virtual address space 512 so that, should any of the processes using the I/O virtual address space 512 go down, the I/O virtual address space 512 is not also taken down. Should the I/O virtual address space 512 be removed, other, still active processes would no longer be able access the packet processor to send and/or receive packet. Thus, the network device 500 can be configured to keep I/O virtual address space 512 regardless of whether any process that is using the I/O virtual address space 512 shuts down.

As an example, under various circumstances, the guest virtual machine 520 may become disabled by hanging, shutting down, going offline, or failing in some fashion. Typically, when this occurs, the network device 500 would remove the I/O virtual address space 512, such as by deleting it from a memory management unit. Should this occur, the reserved DMA map 516 would also be deleted, and the host process's 540 ability to send and receive packets would be interrupted. Thus, in various implementations, the network device 500 can be modified so that, when the guest virtual machine 520 goes offline, the I/O virtual address space 512 is maintained. For example, a hypervisor that supported the guest virtual machine 520 or the host operating system can be modified so that the memory management unit is not instructed to remove the I/O virtual address space 512 when the guest virtual machine 520 goes down. Address spaces within the I/O virtual address space 512, such as the guest VM DMA map 514, may still be freed, however. The reserved DMA map 516, however, would be maintained.

In various implementations, the network device 500 can launch a new guest virtual machine, or failover to a standby virtual machine, either of which can take over the operations of the previous guest virtual machine 520. Typically, when the new guest virtual machine is initiated, the network device 500 would set up a new I/O virtual address space for the new guest virtual machine to use for I/O transactions. This new I/O virtual address space would be different from the I/O virtual address space 512 used by the original guest virtual machine 520. When the new I/O virtual address space is then assigned to the packet processor 530, the host process 540 may, at least temporarily, lose the ability to transmit or receive packets.

To avoid any interruption of the host process's ability to send or receive packets, the network device 500 can, instead of creating a new I/O virtual address space for the new guest virtual machine, have the new guest virtual machine use the existing I/O virtual address space 512. For example, the network device 500 can ensure that a device node for the packet processor 530 is present in the host operating system, and that when the new guest virtual machine boots, the new guest virtual machine can find the device node. Upon finding the device node, the new guest virtual machine can be made to find the existing I/O virtual address space 512, and can choose to use it, rather than having a new I/O virtual address space be created. Once the new guest virtual machine associates with the existing I/O virtual address space 512, the new guest virtual machine can allocate a guest virtual machine DMA space anywhere in the I/O virtual address space 512, other than in the reserved DMA map 516.

Figure 6:
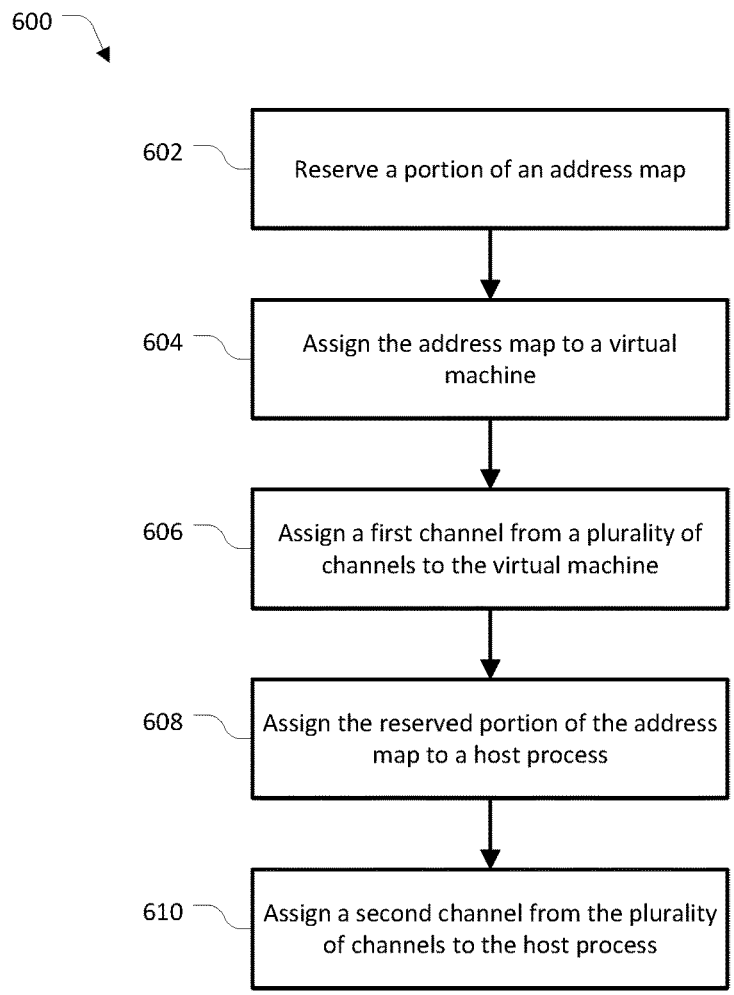
FIG. 6 illustrates an example of a process through which a high-performance packet processor may be shared between two host processes.

FIG. 6 illustrates an example of a process 600 through which a high-performance packet processor can be shared between two host processes, such as a virtual machine and an software keep-alive process. The process 600 may be executed by a network device such as the network device illustrated in FIG. 5.

At step 602 of FIG. 6, the process 600 includes reserving a portion of an address map. In the above discussion, the address map is also referred to as an I/O virtual address space or as a domain. In various implementations, the address map can be configured in a memory management unit, such as an IOMMU. In some implementations, the address map is configured when a virtual machine is first initiated on the network device, where the address map is assigned to the virtual machine. Should the virtual machine become disabled, the network device can be configured to preserve the address map, meaning that the address map is not deleted or destroyed.

In various implementations, when a virtual machine comes online in the network device, the address map may thus be already present in a memory management unit. At step 604, the process 600 can thus include assigning the address map to the virtual machine. In various implementations, the virtual machine can allocate a guest portion in the address map, where the guest portion is allocated in a part of the address map that does not include the reserved portion. The guest portion can thereafter provide address translations between virtual addresses of the virtual machine and physical addresses in memory.

At step 606, the process 600 includes assigning a first channel from a plurality of channels to the virtual machine, where the plurality of channels are provided by a packet processor. Using the first channel, the virtual machine can send and/or receive packets from a network. Specifically, the packet processor can use the first channel to execute DMA operations to place received packets in memory, and fetch packets to be transmitted from memory.

At step 608, the process 600 includes assigning the reserved portion of the address map to a host process. The host process can then use the reserved portion of the address map to translate virtual addresses to physical addresses in memory.

At step 610, the process 600 includes assigning a second channel from the plurality of channels to the host process. Using the second channel, the host process can then send packets to the network. Specifically, the host process can place an outbound packet in memory, and then request that the packet processor transmit the packet. The packet processor can then execute a DMA operation, using the second channel, to read the packet from memory. The packet processor can then transmit the packet.

In certain embodiments, a non-transitory machine-readable or computer-readable medium is provided for storing data and code (instructions) that can be executed by one or more processors. Examples of a non-transitory machine-readable or computer-readable medium include memory disk drives, Compact Disks (CDs), optical drives, removable media cartridges, memory devices, and the like. A non-transitory machine-readable or computer-readable medium may store the basic programming (e.g., instructions, code, program) and data constructs, which when executed by one or more processors, provide the functionality described above. In certain implementations, the non-transitory machine-readable or computer-readable medium may be included in a network device and the instructions or code stored by the medium may be executed by one or more processors of the network device causing the network device to perform certain functions described above. In some other implementations, the non-transitory machine-readable or computer-readable medium may be separate from a network device but can be accessible to the network device such that the instructions or code stored by the medium can be executed by one or more processors of the network device causing the network device to perform certain functions described above. The non-transitory computer-readable or machine-readable medium may be embodied in non-volatile memory or volatile memory.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Although specific embodiments have been described, various modifications, alterations, alternative constructions, and equivalents are also encompassed within the scope of described embodiments. Embodiments described herein are not restricted to operation within certain specific data processing environments, but are free to operate within a plurality of data processing environments. Additionally, although certain implementations have been described using a particular series of transactions and steps, it should be apparent to those skilled in the art that these are not meant to be limiting and are not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software may also be provided. Certain embodiments may be implemented only in hardware, or only in software (e.g., code programs, firmware, middleware, microcode, etc.), or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A network device, comprising:
   one or more processors; and
   a memory coupled with and readable by the one or more processors, wherein the memory is configured to include a first portion of physical memory used by a host process for Input/Output (I/O) operations, wherein the host process is executing on the network device;
   a packet processor including a first channel used by the host process for transmission or receipt of packets and a second channel used by a virtual machine for transmission or receipt of packets, wherein the virtual machine is executing on the network device; and
   a memory management unit, the memory management unit configured to use an address map associated with the packet processor;
   wherein the one or more processors execute instructions to perform operations including:
      reserving a portion of the address map for the host process, the reserved portion including a first set of mappings that map a first set of virtual addresses to a set of addresses in the first portion of physical memory, wherein the host process uses the reserved portion to transmit or receive packets using the first channel; and
      allocating a second portion of the address map for the virtual machine, wherein the second portion is allocated in a part of the address map that does not include the reserved portion, wherein the virtual machine uses the second portion to transmit or receive packets using the second channel.

2. The network device of claim 1, wherein the host process configures the reserved portion of the address map, wherein configuring the reserved portion includes writing addresses from the first portion of physical memory into the reserved portion.

3. The network device of claim 1, wherein a hypervisor configures the second portion of the address map.

4. The network device of claim 1, wherein the host process is configured to use a virtual address to obtain a physical address, wherein the host process uses the reserved portion to obtain the physical address, wherein the physical address is an address in the first portion of physical memory, and wherein the virtual address is in a virtual address space of the virtual machine.

5. The network device of claim 1, wherein the host process is configured to write a packet to the memory using a physical address.

6. The network device of claim 1, wherein the virtual machine is configured to read a packet from the memory using a virtual address.

7. The network device of claim 1, wherein the packet processor is configured to:
   receive, on the second channel, a request to transmit a packet, wherein the request includes a virtual address;
   obtain, using the reserved portion, a physical address for the virtual address;
   read a packet from the memory using the physical address; and
   transmit the packet.

8. The network device of claim 1, wherein the packet processor is configured to:
   receive, at the first channel, a packet;
   obtain, using the second portion of the address map, a physical address for a virtual address, wherein the virtual address was configured by the virtual machine; and
   write the packet to the memory using the physical address.

9. The network device of claim 1, wherein the one or more processors further execute instructions to perform operations, including:
   determining that the virtual machine is no longer executing;
   starting a new virtual machine; and
   allocating a third portion of the address map for the new virtual machine, wherein the third portion is allocated in a part of the address map that does not include the reserved portion, wherein the new virtual machine uses the third portion to transmit or received packets using the second channel.

10. The network device of claim 1, wherein, when the virtual machine shuts down, the address map is preserved.

11. The network device of claim 1, wherein the virtual machine is executing a network operating system.

12. The network device of claim 1, wherein the host process includes a software keep-alive process.

13. A method, comprising:
   reserving a portion of an address map for a host process, the reserved portion including a first set of mappings that map a first set of virtual addresses to a set of addresses in a first portion of physical memory, wherein the host process uses the reserved portion to transmit or receive packets using a first channel of a packet processor, wherein a memory management unit is configured to include the address map, wherein the address map is associated with the packet processor, and wherein the host process is executing on a network device; and
   allocating a second portion of the address map for a virtual machine, wherein the second portion is allocated in a part of the address map that does not include the reserved portion, wherein the virtual machine uses the second portion to transmit or receive packets using a second channel of the packet processor, and wherein the virtual machine is executing on the network device.

14. The method of claim 13, wherein the host process configures the reserved portion of the address map, wherein configuring the reserved portion includes writing addresses from the first portion of physical memory into the reserved portion.

15. The method of claim 13, wherein a hypervisor configures the second portion of the address map.

16. The method of claim 13, further comprising:
   using a virtual address to obtain a physical address, wherein obtaining the physical address includes using the reserved portion to obtain the physical address, wherein the physical address corresponds to an address in the first portion of physical memory, and wherein the virtual address corresponds to a virtual address space of the virtual machine.

17. The method of claim 13, further comprising:
writing a packet to memory using a physical address, wherein the packet is written to memory by the host process.

18. The method of claim 13, further comprising:
reading a packet from memory using a virtual address, wherein the packet is read by the virtual machine.

19. A non-transitory computer-readable medium including instructions that, when executed by one or more processors, cause the one or more processors to perform operations including:
reserving a portion of an address map for a host process, the reserved portion including a first set of mappings that map a first set of virtual addresses to a set of addresses in a first portion of physical memory, wherein the host process uses the reserved portion to transmit or receive packets using a first channel of a packet processor, wherein a memory management unit is configured to include the address map, wherein the address map is associated with the packet processor, and wherein the host process is executing on a network device; and
allocating a second portion of the address map for a virtual machine, wherein the second portion is allocated in a part of the address map that does not include the reserved portion, wherein the virtual machine uses the second portion to transmit or receive packets using a second channel of the packet processor, and wherein the virtual machine is executing on the network device.

20. The non-transitory computer-readable medium of claim 19, wherein the host process configures the reserved portion of the address map, wherein configuring the reserved portion includes writing addresses from the first portion of physical memory into the reserved portion.

21. The non-transitory computer-readable medium of claim 19, wherein a hypervisor configures the second portion of the address map.

22. The non-transitory computer-readable medium of claim 19, further comprising instructions that, when executed by one or more processors, cause the one or more processors to perform operations including:
using a virtual address to obtain a physical address, wherein obtaining the physical address includes using the reserved portion to obtain the physical address, wherein the physical address corresponds to an address in the first portion of physical memory, and wherein the virtual address corresponds to a virtual address space of the virtual machine.

23. The non-transitory computer-readable medium of claim 19, further comprising instructions that, when executed by one or more processors, cause the one or more processors to perform operations including:
writing a packet to memory using a physical address, wherein the packet is written to memory by the host process.

24. The non-transitory computer-readable medium of claim 19, further comprising instructions that, when executed by one or more processors, cause the one or more processors to perform operations including:
reading a packet from memory using a virtual address, wherein the packet is read by the virtual machine.

* * * * *